(12) United States Patent
Bramhill et al.

(10) Patent No.: US 6,623,130 B2
(45) Date of Patent: Sep. 23, 2003

(54) OPTICAL, IMAGE PRODUCING DEVICE

(76) Inventors: Thomas W. Bramhill, 6505 B, Bilberry Drive, Orleans, Ontario (CA), K1C 4N4; Esther Strycharz, 6505 B, Bilberry Drive, Orleans, Ontario (CA), K1C 4N4

( * ) Notice: Subject to any disclaimer, the term of this patent is extended or adjusted under 35 U.S.C. 154(b) by 81 days.

(21) Appl. No.: 10/015,554

(22) Filed: Dec. 17, 2001

(65) Prior Publication Data

US 2003/0112534 A1 Jun. 19, 2003

(51) Int. Cl.[7] .................................. G02B 5/08
(52) U.S. Cl. ................ 359/857; 359/856; 359/858; 359/860; 359/861
(58) Field of Search ................ 359/857, 856, 359/858, 860, 861, 447, 635, 503, 862; 355/25, 44, 50, 66, 81

(56) References Cited

U.S. PATENT DOCUMENTS 2,079,508 A  *  5/1937  Kaplowitz ................ 434/88
3,054,326 A  *  9/1962  Giesecke .................. 359/503
3,227,043 A       1/1966  Swimmer et al.
3,357,769 A      12/1967  Thompson
3,635,557 A  *  1/1972  Alderton .................. 355/65
4,480,895 A  * 11/1984  Carson .................... 359/862

* cited by examiner

Primary Examiner—Mohammad Sikder
(74) Attorney, Agent, or Firm—Francis W. Lemon

(57) ABSTRACT

An optical, image producing device of the Camera Lucidas type is provided wherein the panel on which the optical image is superimposed may be supported at different angles of inclination on a base, to which a mirror assembly carrying column is rigidly attached, so that the inclination of the panel can be adjusted allowing the device to be used tilted to observe an object at different elevations. The column has a viewing aperture which is wide enough for an image to be viewed simultaneously by both eyes to give a panoramic view.

9 Claims, 2 Drawing Sheets

OPTICAL, IMAGE PRODUCING DEVICE

FIELD OF THE INVENTION

This invention relates to an optical, image producing device.

BACKGROUND OF THE INVENTION

Drawing aids, known as Camera Lucidas, have been proposed comprising two mirrors which are firmly mounted on an inclined drawing board, see, for example, U.S. Pat. No. 3,227,043, Jan. 4, 1966, E. J. Swimmer et al, and U.S. Pat. No. 3,357,769, dated Dec. 12, 1967, K. B. Thompson. The mirrors comprise an upper one, which is inclined, for reflecting an image on to a second semi-transparent mirror, through which the drawing board is seen. By this means, an image reflected by the upper mirror on to the semi-transparent mirror, is seen as an apparent image on the drawing board. This apparent image can then be drawn on the drawing board.

The mirrors are firmly attached to the drawing board to reduce the possibility of image shift while the apparent image is being traced on the is drawing board.

Swimmer et al, column 2, lines 35–39, teaches that the mirrors are at a fixed angle between them which is one half the angle of the drawing board to the vertical. With these angles it is stated that the center of the field of vision is perpendicular to the drawing board surface and lies on the horizon in the object field.

K. B. Thompson et al teaches that parallax may be substantially eliminated between the virtual image being viewed, i.e. at the beam splitter (semi-transparent mirror), and the drawing board, by moving the upper mirror, or alternatively the upper mirror and the beam splitter (semi-transparent mirror), relative to the drawing board, see column 7, lines 61–63, and column 8, lines 5 to 10.

While the devices of E. J. Swimmer et al and K. B. Thompson et al are useful, applicants have found that if in use the entire device, i.e. mirrors and drawing board, is tilted forwards or backwards as an assembly to accommodate a particular scene or object at a different elevation or gradient from that at which the device is situated, or, as a result of the device being used in a hand held manner, or simply placed on the lap in a seated position, then it is more or less inevitable that the angle between the plane of the drawing surface and the vertical will vary to a greater or lesser extent from the ideal angle to the vertical, taught by Swimmer et al, at which the drawing board can be viewed making distortions in the apparent image unavoidable. Applicant has found that any adjustment of the mirrors to compensate for this distortion caused the apparent image to move from the center of the board and significantly decrease the height of the apparent image.

There is a need for an optical image producing device wherein the angle between the plane, of say, the drawing board and the vertical may be adjusted in a simple manner, when the device is tilted backwards or forwards to suit the attitude of the device in relation to the height at which an object is to be viewed, without incurring significant movement of the apparent image from the center of the board or any significant change in the height of the apparent image.

From an artist's point of view it is highly desirable, for artistic interpretation of a subject, for the subject to be viewed simultaneously by both eyes to achieve the necessary perceptual appearance of solidity. Known Camera Lucidas proposals use a very restricted viewing aperture in order to produce an image of high definition, and to avoid image shift which would result in tracing inaccuracies. When artistic interpretation is the objective, image shift is not a prime concern, and extreme tracing accuracy is irrelevant and usually detrimental.

There is also a need for a Camera Lucidas device which not only allows the subject to be viewed simultaneously by both eyes, but also allows a wider viewing of the background to the subject giving the image viewed a panoramic effect.

SUMMARY OF THE INVENTION

According to the present invention there is provided an optical, image producing device, comprising, a) a first mirror, b) a second, semi-transparent mirror, c) a column having viewing means for viewing a reflected image of a subject, from the rear of the column, at an upper position thereof, d) mirror mounting means for rigidly securing the first and second mirrors to the column, against movement, in a divergent manner from one another, with the viewing means between them for viewing from their closest ends, and with the first mirror uppermost, so that, in operation, an image of the subject, reflected from the first mirror onto the second mirror, can be seen as the reflected image on the second mirror through the viewing means, e) a base for rigidly supporting the column in an upright position when the device is in use, f) an image superimposing panel, g) panel mounting means, for mounting the panel on the base at different angles of inclination, from the vertical, at which the panel is inclined away from the mirrors at an angle which is about twice the divergent angle between the mirrors, and at which the panel can be viewed through the viewing means, with the said reflected image superimposed thereon, when the base is horizontal or when the device is tilted from that position.

In some embodiments of the present invention the viewing means comprises an aperture in the column of sufficient width through which a reflected image can be viewed simultaneously by both eyes.

In other embodiments of the present invention a hinge is provided attaching the column to the base, and removable means are provided for supporting the column in the upright position, against the base, whereby the column can be stored in a folded or flat position.

The means for supporting the column in the upright position may comprise a mounting block insertable in a lower end of the column.

In other embodiments of the present invention, the panel mounting means comprises a slot in the base, and steps and risers in the bottom of the slot for holding the panel in different reclining positions in the slot.

In yet other embodiments of the present invention, the panel mounting means comprises a slot in the base, the slot having an upper neck portion for slidably supporting the panel, and a series of panel receiving grooves at the bottom of the slot for securing the panel at different inclined positions in the slot.

The panel mounting means preferably has the capability of mounting the panel, at the said angles of inclination from the vertical, in the range of about 10° to about 60°.

Better still, the panel mounting means preferably has the capability of mounting the panel, at a said angle of inclination from the vertical, in the range of about 10° to about 45°, when the device is used with the base extending horizontally.

Better still yet, the panel mounting means preferably has the capability of mounting the panel at a said angle of inclination in the range of about 35° to about 45°, when the device is used with the base extending horizontally.

BRIEF DESCRIPTION OF THE DRAWINGS

In the accompanying drawings which illustrate by way of example, embodiments of the present invention.

DETAILED DESCRIPTION OF THE PREFERRED EMBODIMENTS

Figure 1:
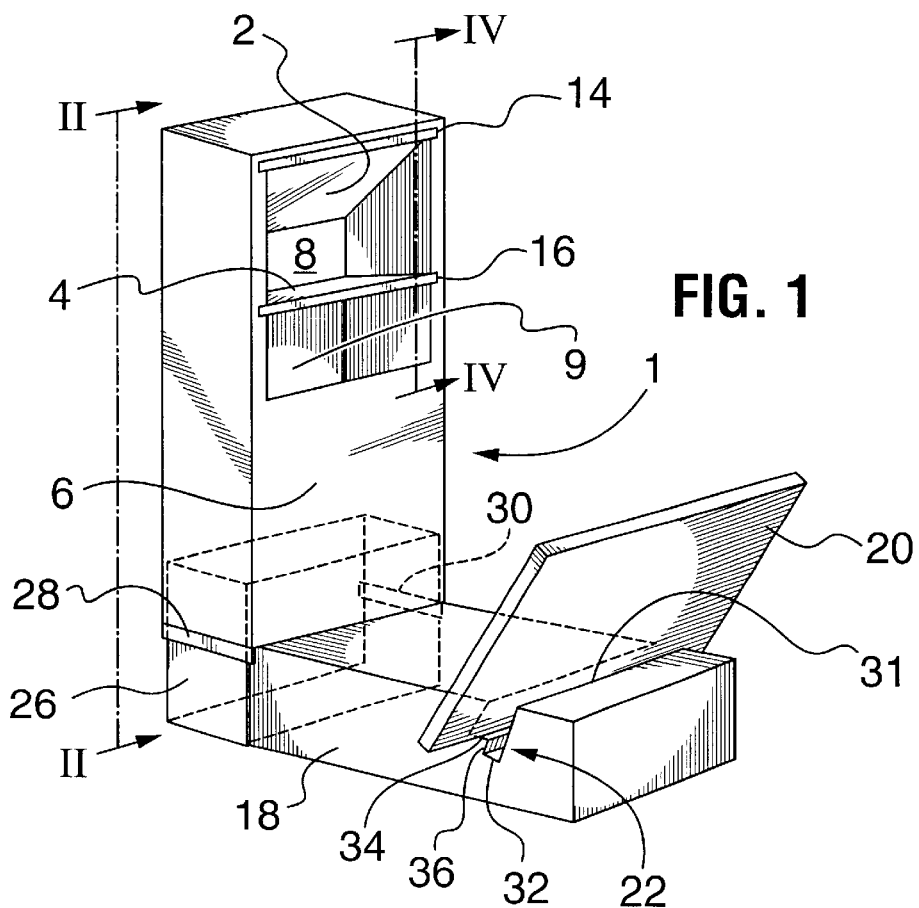
FIG. 1 is a corner, frontal view of an optical, image producing device.
Figure 2:
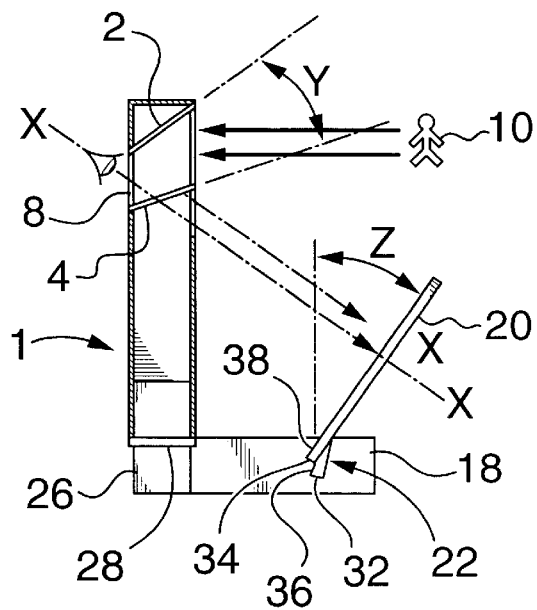
FIG. 2 is a partly sectioned side view in the direction II—II, FIG. 1.
Figure 3:
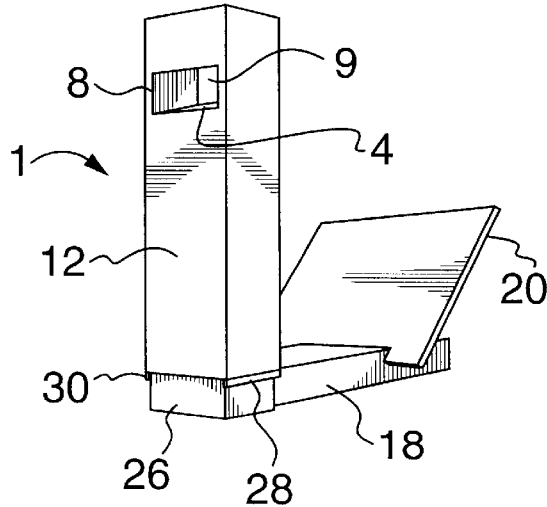
FIG. 3 is a corner view showing the back of the device shown in FIG. 1.
Figure 4:
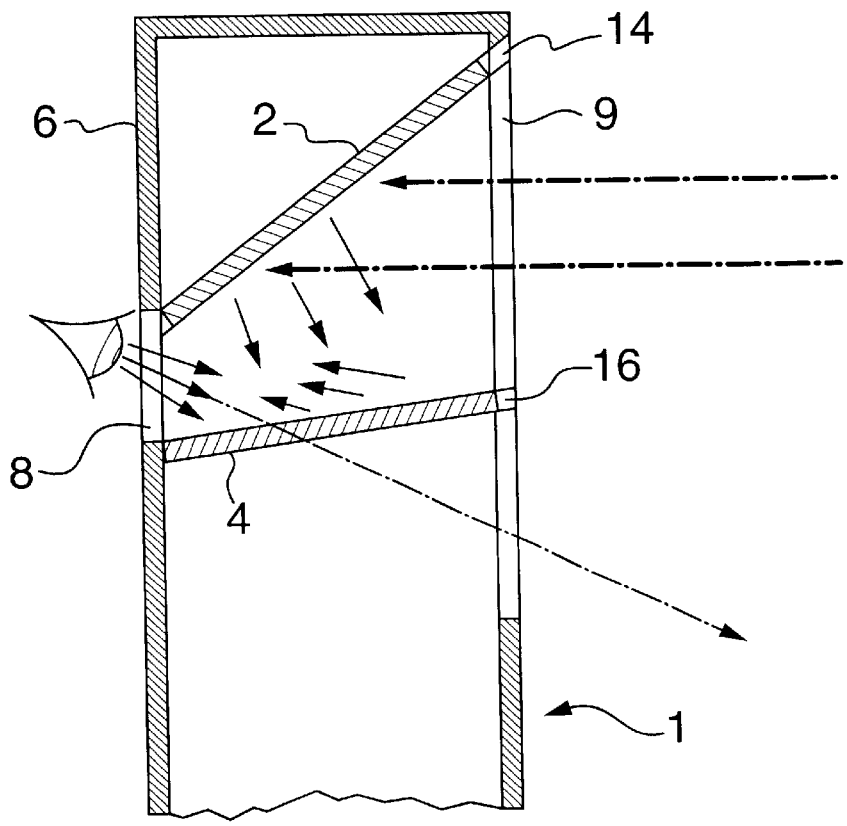
FIG. 4 is a sectional side view along IV—IV, FIG. 1, of a column portion of the device shown in FIG. 1.

Referring now to FIGS. 1 to 3, there is shown, an optical, image producing device, generally designated 1, comprising, a) a first mirror 2, b) a second, semi-transparent mirror 4, c) a column 6 having viewing means, in the form of apertures 8 and 9, for viewing a reflected image of a subject 10 (FIG. 2), from the rear 12 of the column 6 at an upper position thereof, d) mirror mounting means, in the form of closed ended slots 14 and 16 (FIG. 1 and 4) into which the first and second mirrors, 2 and 4 respectively, may be slid, for rigidly securing the first and second mirrors, 2 and 4 respectively, to the column 6 against movement in divergent manner from one another, with the viewing means 8 between them for viewing from their closest ends, and with the first mirror 2 uppermost, so that, in operation, an image of a subject reflected from the first mirror 2 on to the second mirror 4, can be seen on the second mirror 4 as the reflected image by looking thereon by the viewing means 8, e) a base 18 for rigidly supporting the column 7 in an upright position when the devices 1 is in use, f) an image superimposing panel 20, and g) panel mounting means, generally designated 22, for mounting the panel 20 on the base 18 at different angles of inclination at which the panel 20 is inclined away from the mirrors 2 and 4, from the vertical, at an angle Z (FIG. 2) which is about twice the divergent angle Y between the mirrors 2 and 4, and at which the panel 20 can generally be viewed through the viewing means, with the said reflected image superimposed thereon, when the base 18 is horizontal or when the device 1 is tilted from that position.

The apertures 8 and 9 are wide enough for a reflected image to be viewed through them by both eyes simultaneously.

Figure 5:
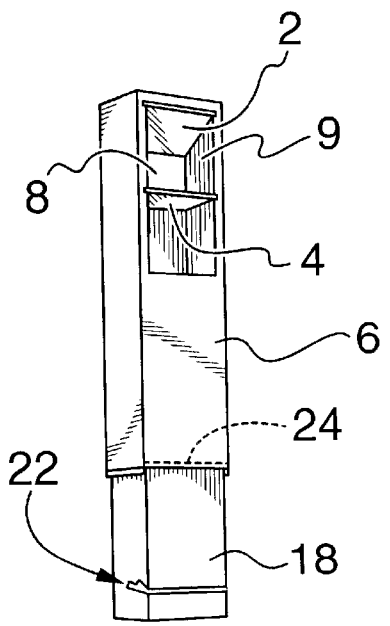
FIG. 5 is a corner, front view of the columns and a base, shown in FIG. 1, with the base folded back for storage.

In this embodiment of the present invention, the base 18 is joined to the column 6 by means of a hinge 24 (shown dotted in FIG. 5). A column mounting block 26, with side arms 28 and 30 column 6, is provided, which is removably slid into the lower end of the column 6 to support the column 6 in the upright position, against the base 18. This allows the column 6 and the base 18 to be packaged and stored in a flat condition as shown in FIG. 5.

The panel mounting means 22 comprises a slot 31 in the base 18, and steps 32 and 34 and risers 36 and 38 in the bottom of the slot 31, so that the panel 20 can recline in the slot 31, on the step 32 or 34, leaning against the risers 36 or 38.

In operation, the device 1 is assembled as shown in FIGS. 1 to 4, with the angle Y (FIG. 2) between the mirrors 2 and 4 equal to about one half of the angle Z between the vertical and the upper surface of the panel 20. Typically, angle Z may suitably be about 40° and angle Y may be about 20°. With the mirrors 2 and 4, and the panel 20 set at these angles, the device 1 can be used with the base 18 extending substantially horizontally, and an image of the object 10 is received by the mirror 2 substantially horizontally. That image is then reflected from the second mirror 4 to be viewed by the viewing means as a superimposed image more or less centrally on the panel 20, substantially without any distortions, and over substantially the whole of the panel 20. With this arrangement, preferably the panel 20 is generally viewed at right angles, through the viewing means apertures 8 and 9, when the base 18 is horizontal, if this is the medial position of use.

Should it be necessary for the device 1 to be tilted forwards to view an object 10 at a lower level, then the panel 20 is moved into the step 32 so that the panel 20 will still be viewed generally through the viewing means apertures 8 and 9. This ensures that angle Y is maintained at about one half of the angle Z, and the superimposed image is again viewed substantially without any distortions and over substantially the whole of the panel 20 without any significant decrease in height.

In practice, it has been found that a number of steps and risers are preferably provided so that the panel 20 can be tilted at a number of positions from angle Z equalling about 10° to 60°, preferably about 35° to 40°. The angle Z for using the device 1 with the base extending horizontally, may then be at a position in the range about 10° to 45°, or better still about 35° to 45° so that the device 1 can be used either tilted backwards or forwards.

Figure 6:
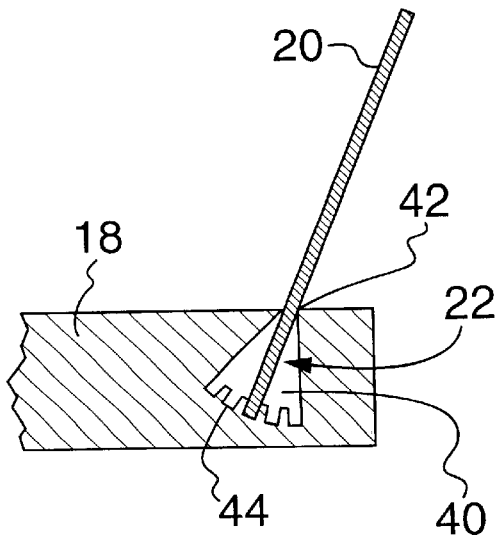
FIG. 6 is a scrap, sectional side view a different embodiment to that shown in FIG. 1–5.

In FIG. 6, similar parts to those shown in FIGS. 1 to 5 are designated by the same reference numeral and the previous description is relied upon to describe them.

In FIG. 6, the mounting means 22 comprises, slot 40 in the base 18, the slot 40 having an upper neck portion 42 within which the panel 20 is suitably supported, and a series of panel receiving grooves 44 at the bottom of the slot 40 for securing the panel 20.

If desired, the column 6 may be stored folded by the hinge 24, instead of in the flat condition shown in FIG. 5.

It is within the scope of the present invention to provide means for supporting the device in the various tilted positions so that both of the users' hands are free for other uses than holding the device 1 in the viewing position.

What is claimed is:

1. An optical image providing device comprising:

a) a first mirror, b) a second semi-transparent mirror, c) a column having viewing means for viewing a reflected image of a subject from the rear of the column at an upper position thereof, d) mirror mounting means for rigidly securing the first and second mirrors to the column against movement in a divergent manner from one another, with the viewing means them for viewing from their closest ends and with the first mirror uppermost, so that in operation an image of the subject reflected from the first mirror on to the second mirror can be seen as the reflected image on the second mirror through the viewing means, e) a base for rigidly supporting the column in an upright position when the device is in use, f) panel mounting means for mounting the panel on the base at different angles of inclination from the vertical, at which the panel is inclined away from the mirrors at an angle which is about twice the divergent angle between the mirrors and at which the panel can generally be viewed through the viewing means with said reflected image superimposed thereon, when the base is horizontal and when the device is tilted from that position.

2. A device according to claim 1, wherein the viewing means comprises an aperture in the column of sufficient width through which a reflected image can be viewed simultaneously by both eyes.

3. A device according to claim 1, further comprising a hinge attaching the column to the base, and removable means for supporting the column in the upright position against the base, whereby the column can be stored in a folded or flat position.

4. A device according to claim 3, wherein the means for supporting the column in an upright position comprises a mounting block insertable in a lower end of the column.

5. A device according to claim 1, wherein the panel mounting means comprises a slot in the base and steps and risers in the bottom of the slot for holding the panel in different reclining positions in the slot.

6. A device according to claim 1, wherein the panel mounting means comprises a slot in the base, the slot having an upper neck portion for slidably supporting the panel, and a series of panel receiving grooves at the bottom of the slot for securing the panel at different inclined positions in the slot.

7. A device according to claim 1, wherein the panel mounting means is capable of mounting the panel at said angles of inclination from the vertical in the range of about 10° to about 60°.

8. A device according to claim 7, wherein the panel mounting means is capable of mounting the panel at a said angle of inclination from the vertical in the range of about 10° to about 45°, when the device is used with the base extending horizontally.

9. A device according to claim 7, wherein the panel mounting means is capable of mounting the panel at a said angle of inclination in the range of about 35° to about 45°when the device is used with the base extending horizontally.

* * * * *

UNITED STATES PATENT AND TRADEMARK OFFICE
CERTIFICATE OF CORRECTION

PATENT NO.     : 6,623,130 B2
DATED          : November 5, 2003
INVENTOR(S)    : Thomas W. Bramhill and Esther Staycharz It is certified that error appears in the above-identified patent and that said Letters Patent is hereby corrected as shown below:

Column 5,
Line 4, incorrect version "means them" it should read -- means between them --

Signed and Sealed this

Tenth Day of February, 2004

JON W. DUDAS
*Acting Director of the United States Patent and Trademark Office*